United States Patent Office 3,655,670
Patented Apr. 11, 1972

3,655,670
3-HYDROXY - 4 - SULFONE QUINOPHTHALONE DYESTUFFS AND PROCESS FOR MAKING THEM
Ernst Spietschka, Oberauroff, and Friedrich Ische, Kelkheim, Taunus, Germany, assignors to Farbwerke Hoechst Aktiengesellschaft vormals Meister Lucius & Bruning, Frankfurt am Main, Germany
No Drawing. Filed May 19, 1969, Ser. No. 825,970
Claims priority, application Germany, May 24, 1968,
P 17 69 436.9
Int. Cl. C07d 33/38
U.S. Cl. 260—283 S     6 Claims

ABSTRACT OF THE DISCLOSURE 3-hydroxy-quinophthalone dyestuffs substituted in the 4-position by a sulfone group, and a process for preparing them. Said dyestuffs yield on synthetic fibrous materials, especially those from polyethylene terephthalates, yellow dyeings having good fastness to light, wet processing and solvents and a remarkably good fastness to thermofixation and ironing.

The present invention provides quinophthalone dyestuffs having the general formula

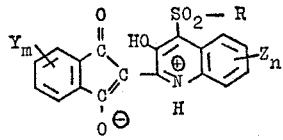

in which R represents an aryl radical, an aliphatic or cycloaliphatic radical or a heterocyclic ring, Y represents hydrogen or halogen, a nitro group or a phenyl radical, Z represents hydrogen or halogen, $m$ stands for an integer from 1 to 4 and $n$ is 1 or 2 and a process for preparing same.

In German Auslegeschrift 1,168,862 compounds of the quinophthalone series are disclosed as suitable for dyeing polyester fibres.

From substituted quinophthalones 4-bromo-3-hydroxy-quinophthalone, a dyestuff especially fast to light in regard to polyester fibres and of moderate fastness to thermofixation is described in U.S. Pat. No. 3,036,876 and British patent specification 1,036,389.

It has now been found that new quinophthalone dyestuffs fast to thermofixing and corresponding to the general formula

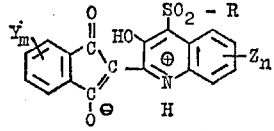

in which R represents an aryl radical, an aliphatic or cycloaliphatic radical or a heterocyclic ring, Y represents hydrogen or halogen, a nitro group or a phenyl radical, Z represents hydrogen or halogen, $m$ stands for an integer from 1 to 4 and $n$ is 1 or 2 are obtained by reaction of 4-halogeno - 3 - hydroxyquinophthalone of the general formula

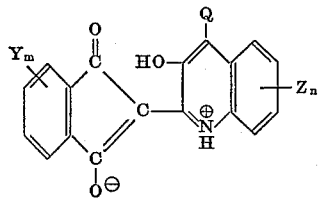

in which Q is chlorine or bromine and Y, Z, $m$ and $n$ have the meanings given above with sulfinic acid salts of the formula $$R—SO_2Me$$

in which R is defined as above and Me represents the ion of an alkali metal.

The aryl radical R in the above-identified formula preferably is a phenyl, naphthyl, anthraquinonyl or fluorenyl radical. Said radicals may carry one or more substituents, for example, hydroxy, alkoxy, nitro carboalkoxy, carboxyl, amino, alkyl, phenyl, naphthyl or benzyl groups or halogen atoms. The aliphatic or cycloaliphatic radical R which, preferably, is an alkyl or cycloalkyl radical or the heterocyclic ring R in the afore-said formula may likewise carry substituents, for example hydroxy, alkoxy, aryloxy, especially phenoxy, cyano, sulfonyl, amino or aryl groups, preferably phenyl or naphthyl groups or halogen atoms.

As suitable starting substances of the quinophthalone series for example 4-bromo-3-hydroxy-quinophthalone,
4-chloro-3-hydroxy-quinophthalone,
4,5′,6′-tribromo-3-hydroxy-quinophthalone,
4,4′,5′,6′,7′-pentabromo-3-hydroxy-quinophthalone,
4-bromo-4′,7′-dichloro-3-hydroxy-quinophthalone,
4-bromo-4′,5′,6′,7′-tetrachloro-3-hydroxy-quinophthalone,
4-bromo-4′-fluoro-3-hydroxy-quinophthalone,
4-bromo-5′-nitro-3-hydroxy-quinophthalone,
4,6-dibromo-3-hydroxy-quinophthalone,
4-bromo-5,7-dichloro-3-hydroxy-quinophthalone and
4-bromo-5′-phenyl-3-hydroxy-quinophthalone may be used.

Suitable salts of sulfinic acids are, for example, sodium or potassium salts of methane-sulfinic acid,
ethanesulfinic acid,
pentane-1-sulfinic acid,
octane-1-sulfinic acid,
dodecane-1-sulfinic acid,
chloromethane sulfinic acid,
ocetane-1-sulfinic acid,
dodecane-1-sulfinic acid,
chloro-methane-sulfinic acid,
2-hydroxy-ethane-1-sulfinic acid,
aminomethane-sulfinic acid,
benzene-sulfinic acid,
4-toluene-sulfinic acid,
3,4-dimethyl-benzene-sulfinic acid,
2,4,5-trimethyl-benzene-sulfinic acid,
4-nitrobenzene-sulfinic acid,
2,4-dinitrobenzene-sulfinic acid,
4-chlorobenzene-sulfinic acid,
4-fluorobenzene-sulfinic acid,
4-iodobenzene-sulfinic acid,
2-chloro-5-nitrobenzene-sulfinic acid,
4-hydroxy-3-carboxy-benzene-sulfinic acid,
3,5-dicarboxy-benzene-sulfinic acid,
4-amino-toluene-2-sulfinic acid,
1-methoxy-2-acetylamino-benzene-4-sulfinic acid,
2-methoxy-benzene-sulfinic acid,
4-methoxy-benzene-sulfinic acid,
4-n-dodecyl-benzene-sulfinic acid,
cyclohexane-sulfinic acid,
naphthalene-1-sulfinic acid,
anthraquinone-1-sulfinic acid,
fluorene-1-sulfinic acid and
benzthiazol-2-sulfinic acid.

Such sulfinic acids are disclosed, for example, in Ullmans Encyklopadie der Technischen Chemie, (1965), vol. 16, pp. 486–490, and Houben-Weyl, Methoden der Organischen Chemie, (1955), vol. 9, pp. 289–296.

The reaction is preferably conducted in a polar solvent which has a good dissolving power for alkali metal salts of sulfinic acids. As such solvents for example phosphoric acid-tris-dimethylamide, dimethylformamide, N - methylacetamide, dimethyl-sulfoxide and the like are convenient.

In general, the reaction compounds are employed in the amounts calculated. In some cases the alkali metal salt of sulfinic acid is advantageously used in a slighter excess, for example, about 10–20%.

The temperature at which the reaction proceeds depends on the reaction components and the type of solvent used. In general, it is advantageously, in the range between 80° and 180° C., preferably between about 100° and 150° C.

The dyestuff is isolated by cooling of the solution and suction-filtration of the crystallized dyestuff or by pouring the solution in water or a lower alcohol, for example methanol and drawing off the precipitated dyestuff.

The dyestuffs of the invention yield on synthetic fibrous materials, especially those consisting of polyethyleneterephthalates, yellow dyeings having a good fastness to light, wet processing and solvents and remarkably good fastness to thermofixation and ironing. The dyeings produced with the dyestuffs of the invention show in comparison to dyeings obtained with 3-hydroxy-quinophthalone or 4-bromo-3-hydroxy-quinophthalone a superior fastness to thermofixation.

In order to produce fast dyeings, polyester materials are treated with the said dyestuffs in the presence of carriers at between 80° and 110° C. or, without carriers, at between 110° and 140° C. In order to produce prints, aqueous printing pastes are printed on the polyester tissue which is, subsequently, steamed in the presence of a carrier at between 95° and 110° C. or, in the absence thereof at between 120° and 140° C. The dyeing or printing can likewise be effected by the so-called thermosol process wherein the padded or printed materials are shortly subjected to a heat treatment at between 180° and 200° C. The dyestuffs provided by the instant process may be used with as good result also for dyeing polyethylene terephthalates in the mass.

The following examples illustrate the invention but they are not intended to limit it thereto. The parts and percentages are by weight unless otherwise stated.

EXAMPLE 1

10 parts of 4-bromo-3-hydroxy-quinophthalone and 5 parts of sodium salt of methane-sulfinic acid were introduced into 100 parts of phosphoric acid-tris-dimethylamide and the mixture was heated to 100° C. until no more starting substance was ascertained subsequently the mixture was cooled to room temperature and introduced into 500 parts of methanol. The dyestuff was drawn off, washed with methanol and water and dried. 9 parts i.e. 94% of the theory of the dyestuff of formula

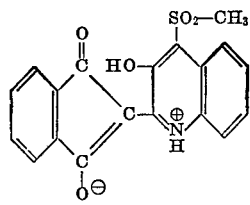

were obtained melting at 280° C. It dyed polyethyleneterephthalate fibres and films yellow shades very fast to light, wet processing and thermofixing.

EXAMPLE 2

10 parts of 4-bromo-3-hydroxy-quinophthalone and 6 parts of sodium salt of benzene-sulfinic acid were introduced into 100 parts of dimethylformamide and the mixture was heated to 140°–150° C. until no more starting substance was ascertained. The whole was cooled to room temperature and diluted with 500 parts of water. The dyestuff was drawn off, washed with water and dried.

11 parts i.e. 95% of the theory of the dyestuff of formula

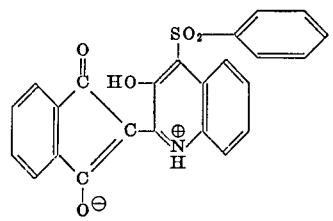

were obtained melting at 287° C.

It dyed polyethylene terephthalate fibres and films yellow shades having very good fastness properties, in particular excellent fastness to thermofixation.

EXAMPLE 3

9 parts of 4-chloro-3-hydroxy-quinophthalone and 6 parts of potassium salt of 3 - chloro - toluene - 6 - sulfinic acid were introduced into 100 parts of dimethyl-sulfoxide and the mixture was heated to 125° to 130° C. until in a sample no more starting material was traced. The batch was cooled to room temperature and diluted with 500 parts of methanol. The dyestuff was drawn off, washed with methanol and water and dried.

10 parts i.e. 76% of the theory of the dyestuff corresponding to the formula

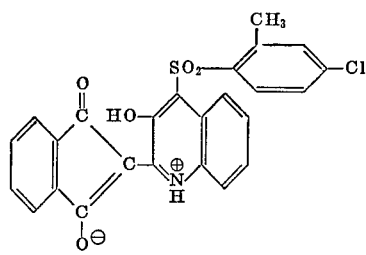

were obtained melting at 250° C.

Said dyestuff dyed polyethylene-terephthalate fibers and films yellow shades very fast to light, wet processing and thermofixation.

In the following table further dyestuffs are listed obtainable by the method disclosed in Examples 1 to 3.

| Starting substance | Reacted with— | Dyestuff | Shade |
|---|---|---|---|
| 4-bromo-3-hydroxy quinophthalone. | Sodium salt of— | | |
| | Ethane-sulfinic acid | 4-ethylsulfonyl-3-hydroxy-quinophthalone | Yellow. |
| Do | Phenthane-(1)-sulfinic acid | 4-n-pentylsulfonyl-3-hydroxy-quinophthalone | Do. |
| Do | Ocetane-(1)-sulfinic acid | 4-n-octylsulfonyl-3-hydroxy-quinophthalone | Do. |
| Do | Chloromethane-sulfinic acid | 4-chloromethylsulfonyl-3-hydroxy-quinophthalone | Do. |
| Do | 2-hydroxy-ethane-sulfinic acid | 4-β-hydroxy-ethylsulfonyl-3-hydroxy-quinophthalone | Do. |
| Do | 4-toluene-sulfinic acid | 4-(4'-methyl-phenyl-sulfonyl)-3-hydroxy-quinophthalone | Do. |
| Do | 3,4-dimethyl-benzene-sulfinic acid | 4-(3',4'-dimethyl-phenyl-sulfonyl)-3-hydroxy-quinophthalone | Do. |
| Do | 2-methoxy-benzene-sulfinic acid | 4-(2'-methoxy-phenyl-sulfonyl)-3-hydroxy-quinophthalone | Do. |
| Do | 4-nitro-benzene-sulfinic acid | 4-(4'-nitro-phenyl-sulfonyl)-3-hydroxy-quinophthalone | Do. |
| Do | 4-chloro-benzene-sulfinic acid | 4-(4'-chloro-phenyl-sulfonyl)-3-hydroxy-quinophthalone | Do. |
| Do | 4-fluoro-benzene-sulfinic acid | 4-(4'-fluoro-phenyl-sulfonyl)-3-hydroxy-quinophthalone | Do. |

| Starting substance | Reacted with— | Dyestuff | Shade |
|---|---|---|---|
| 4-bromo-3-hydroxy quinophthalone. | 4-iodo-benzene-sulfinic acid | 4-(4'-iodo-phenyl-sulfonyl)-3-hydroxy-quinophthalone | Yellow. |
| Do | 2-chloro-5-nitro-benzene-sulfinic acid | 4-(2'-chloro-5'-nitro-phenyl-sulfonyl)-3-hydroxy-quinophthalone | Do. |
| Do | 4-hydroxy-3-carboxy-benzene-sulfinic acid. | 4-(4'-hydroxy-3'-carboxy-phenyl-sulfonyl)-3-hydroxy-quinophthalone | Do. |
| Do | 3,5-dicarboxy-benzene-sulfinic acid | 4-(3',5'-dicarboxy-phenyl-sulfonyl)-3-hydroxy-quinophthalone | Do. |
| Do | 4-amino-toluene-2-sulfinic acid | 4-(5'-amino-2'-methyl-phenyl-sulfonyl(-3-hydroxy-quinophthalone | Do. |
| Do | Potassium salt of 4-n-dodecyl-benzene-sulfinic acid. | 4-(4'-n-dodecyl-phenyl-sulfonyl)-3-hydroxy-quinophthalone | Do. |
| | Sodium salt of— | | |
| Do | Cyclohexane-sulfinic acid | 4-cyclohexyl-sulfonyl-3-hydroxy-quinophthalone | Do. |
| Do | Naphthalene-1-sulfinic acid | 4-(1'-naphthyl-sulfonyl)-3-hydroxy-quinophthalone | Do. |
| Do | Anthraquinone-1-sulfinic acid | 4-(1'-anthraquinonyl-sulfonyl)-3-hydroxy-quinophthalone | Do. |
| Do | Fluorene-1-sulfinic acid | 4-(1'-fluorenyl-sulfonyl)-3-hydroxy-quinophthalone | Do. |
| Do | Benzthiazol-2-sulfinic acid | 4-(2'-benzthiazolyl-sulfonyl)-3-hydroxy-quinophthalone | Do. |
| 4'-chloro-4-bromo-3-hydroxy-quinophthalone. | Benzene-sulfinic acid | 4'-chloro-4-phenylsulfonyl-3-hydroxy-quinophthalone | Do. |
| 5'-phenyl-4-bromo-3-hydroxy-quinophthalone. | Methanosulfinic acid | 5'-phenyl-4-methyl-sulfonyl-3-hydroxy-quinophthalone | Do. |
| 5'-nitro-4-bromo-3-hydroxy-quinophthalone. | 4-toluene-sulfinic acid | 5'-nitro-4-(4'-methylphenyl-sulfonyl)-3-hydroxy-quinophthalone | Do. |
| 4',5',6',7'-tetrachloro-4-bromo-3-hydroxy-quinophthalone. | 4-chloro-benzene-sulfinic acid | 4',5',6',7'-tetrachloro-4-(4''-chloro-phenyl-sulfonyl)-3-hydroxy-quinophthalone | Do. |
| 4-bromo-5,7-dichloro-3-hydroxy-quinophthalone. | Benzene-sulfinic acid | 5,7-dichloro-4-phenylsulfonyl-3-hydroxy-quinophthalone | Do. |
| 4-bromo-3-hydroxy-quinophthalone. | 4-(β-hydroxy-ethoxy)-benzene-sulfinic acid. | 4-[4'-(β-hydroxy-ethoxy)-phenylsulfonyl]-3-hydroxy-quinophthalone | Do. |
| Do | 2-(β-hydroxy-ethoxy)-benzene-sulfinic acid. | 4-[2'-(β-hydroxy-ethoxy)-phenylsulfonyl]-3-hydroxy-quinophthalone | Do. |
| Do | 4-butoxy-benzene-sulfinic acid | 4-(4'-butoxy-phenyl-sulfonyl)-3-hydroxy-quinophthalone | Do. |
| Do | 4-bromo-benzene-sulfinic acid | 4-(4'-bromo-phenyl-sulfonyl)-3-hydroxy-quinophthalone | Do. |
| 4,4',5',6',7'-pentabromo-3-hydroxy-quinophthalone. | Benzene-sulfinic acid | 4',5',6',7'-tetrabromo-4-phenyl-sulfonyl-3-hydroxy-quinophthalone | Do. |
| 4,7-dibromo-3-hydroxy-quinophthalone. | do | 7-bromo-4-phenylsulfonyl-3-hydroxy-quinophthalone | Do. |

We claim:
1. A dyestuff of the formula

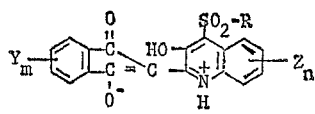

wherein R is phenyl, phenyl substituted by one or two of the groups alkyl having 1 to 12 carbon atoms, alkoxy of 1 to 4 carbon atoms, halogen, nitro, hydroxy, carboxy, amino or hydroxy lower alkoxy, naphthyl, anthraquinonyl, fluorenyl, alkyl having 1 to 8 carbon atoms, chloro lower alkyl, hydroxy lower alkyl, cyclohexyl or benzthiazolyl-2-, Y is hydrogen, chlorine, bromine, nitro or phenyl, Z is hydrogen, chlorine or bromine, $m$ is an integer 1 to 4, provided that $m$ is 1 when Y is nitro or phenyl, and $n$ is an integer 1 or 2.

2. The dyestuff of the formula

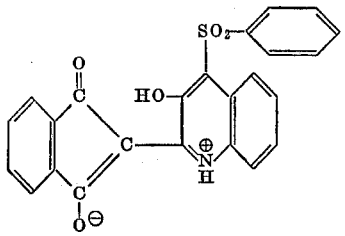

3. The dyestuff of the formula

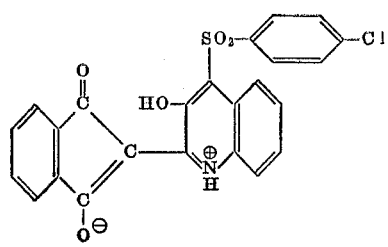

4. The dyestuff of the formula

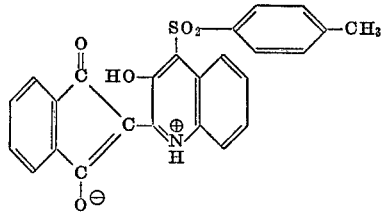

5. The dyestuff of the formula

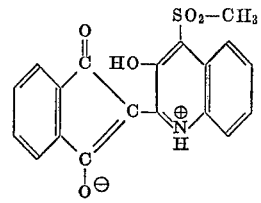

6. The dyestuff of the formula

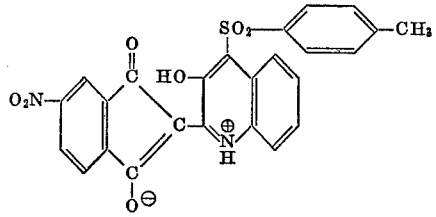

References Cited

UNITED STATES PATENTS

| 3,036,876 | 5/1962 | Schoellig et al. | 260—289 QP |
| 3,196,155 | 7/1965 | Gailliot et al. | 260—288 X |
| 3,293,246 | 12/1966 | Fuchs | 260—286 |
| 3,444,175 | 5/1969 | Shaw | 260—283 |

FOREIGN PATENTS

| 1,036,389 | 7/1966 | Great Britain | 260—289 QP |

DONALD G. DAUS, Examiner

U.S. Cl. X.R.

8—55; 260—283 QP, 288 R